US008636598B2

(12) United States Patent
Radek et al.

(10) Patent No.: US 8,636,598 B2
(45) Date of Patent: Jan. 28, 2014

(54) WAGERING GAME CONTROL OF A MOTION CAPABLE CHAIR

(75) Inventors: Paul Radek, Naperville, IL (US); Edward Brunell, Chicago, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 142 days.

(21) Appl. No.: 13/286,425

(22) Filed: Nov. 1, 2011

(65) Prior Publication Data

US 2012/0108321 A1 May 3, 2012

Related U.S. Application Data

(60) Provisional application No. 61/409,000, filed on Nov. 1, 2010.

(51) Int. Cl.
*A63F 9/00* (2006.01)
*B60N 2/42* (2006.01)

(52) U.S. Cl.
USPC ................... 463/48; 463/16; 463/25; 463/43; 463/46; 273/138.1; 297/217.1; 297/217.4

(58) Field of Classification Search
USPC .......... 463/1, 16–22, 36–39, 46, 43; 297/313, 297/327, 330, 217.1, 217.3–217.4; 434/33
See application file for complete search history.

(56) References Cited

U.S. PATENT DOCUMENTS

| | | | | |
|---|---|---|---|---|
| 5,364,270 | A * | 11/1994 | Aoyama et al. | 434/55 |
| 6,530,842 | B1 * | 3/2003 | Wells et al. | 463/46 |
| 6,733,293 | B2 * | 5/2004 | Baker et al. | 434/55 |
| 2003/0160783 | A1 * | 8/2003 | Saikawa et al. | 345/419 |
| 2007/0123354 | A1 * | 5/2007 | Okada | 463/47 |
| 2008/0054561 | A1 * | 3/2008 | Canterbury et al. | 273/148 B |
| 2008/0113755 | A1 * | 5/2008 | Rasmussen et al. | 463/20 |
| 2009/0163283 | A1 * | 6/2009 | Childress | 463/47 |
| 2010/0216553 | A1 * | 8/2010 | Chudley et al. | 463/42 |
| 2010/0234094 | A1 * | 9/2010 | Gagner et al. | 463/20 |
| 2011/0111847 | A1 * | 5/2011 | Lesley et al. | 463/30 |
| 2011/0248837 | A1 * | 10/2011 | Israr et al. | 340/407.1 |

* cited by examiner

*Primary Examiner* — Dmitry Suhol
*Assistant Examiner* — Alex F.R.P. Rada, II
(74) *Attorney, Agent, or Firm* — Schwegman, Lundberg & Woessner, P.A.

(57) ABSTRACT

Systems described herein include wagering game systems having a motion capable chair. The disclosure addresses example systems and methods to control the motion capable chair, including utilization of user preferences, applying output of a physic engine, and monitoring safety conditions for the motion capable chair. In addition, movement of chairs on multiple wagering game systems may be coordinated in response to events occurring on one or more machines in the system.

20 Claims, 8 Drawing Sheets

WAGERING GAME CONTROL OF A MOTION CAPABLE CHAIR

RELATED APPLICATION

This application claims the benefit of priority under 35 U.S.C. 119(e) to U.S. Provisional Patent Application Ser. No. 61/409,000, filed on Nov. 1, 2010, which is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to controlling motion capable chairs in wagering game systems.

BACKGROUND

Wagering game machines, such as slot machines, video poker machines and the like, have been a cornerstone of the gaming industry for years. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

Gaming machine design and innovation has primarily focused on game play, attraction devices, lighting, bonus rounds, payout mechanisms, progressives, and networking. While chairs have been provided as part of some gaming machines, any additional functionality provided by the chair beyond providing a convenient place for the player to sit have been limited to adding audio capability to the chair.

BRIEF DESCRIPTION OF THE FIGURES

Embodiments of the invention are illustrated by way of example and not limitation in the Figures of the accompanying drawings in which.

DESCRIPTION OF THE EMBODIMENTS

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter other than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" are not intended necessarily to refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

Example Wagering Game Assembly

Figure 1:
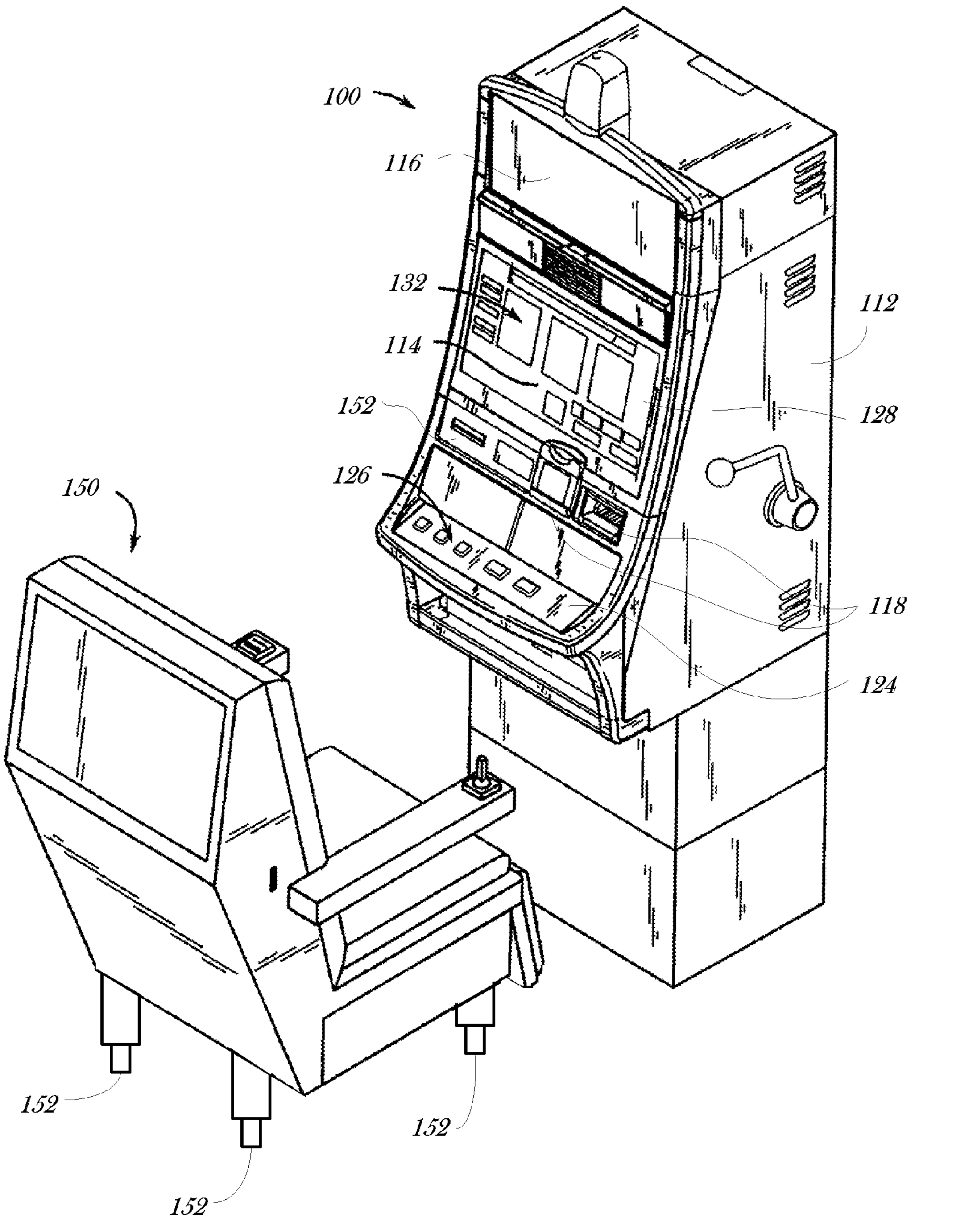
FIG. 1 is a perspective view of a wagering game assembly with a motion capable chair in accordance with one embodiment.

FIG. 1 depicts an example wagering game assembly 100, as one example assembly incorporating novel devices and methods as described herein. According to embodiments, the wagering game assembly 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game assembly 100 comprises a housing 412 and includes input devices, including value input devices 118 and a player input device 124. For output, the wagering game assembly 100 includes a primary display 114 for displaying information about a basic wagering game. The primary display 114 can also display information about a bonus wagering game and a progressive wagering game. The wagering game assembly 100 also includes a secondary display 116 for displaying wagering game events, wagering game outcomes, and/or signage information. While some components of the wagering game assembly 100 are described herein, numerous other elements can exist and can be used in any number or combination to create varying forms of the wagering game assembly 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game assembly 100.

The player input device 124 comprises a plurality of push buttons on a button panel 126 for operating the wagering game assembly 100. In addition, or alternatively, the player input device 124 can comprise a touch screen 128 mounted over the primary display 114 and/or secondary display 116.

The various components of the wagering game assembly 100 can be connected directly to, or contained within, the housing 112. Alternatively, some of the wagering game machine's components can be located outside of the housing 112, while being communicatively coupled with the wagering game assembly 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 400. Alternatively, the primary display 114 can include a number of mechanical reels to display the outcome. In FIG. 1, the wagering game assembly 100 is an "upright" version in which the primary display 114 is oriented vertically relative to the player. Alternatively, the wagering game machine can be a "slant-top" version in which the primary display 114 is slanted at about a thirty-degree angle toward the player of the wagering game assembly 100. In yet another embodiment, the wagering game assembly 100 can exhibit any suitable form factor, such as a free standing model, bartop model, mobile handheld model, or workstation console model.

Wagering game assembly 100 includes a motion capable chair 150. Motion capable chair 150 is located in operational proximity of the housing 112 and includes a plurality of actuators 152. Actuators 152 may be electro-mechanical, pneumatic, hydraulic or any other type of actuator that may be controlled to cause the chair to move in various ways. For example, chair height, pitch and/or roll may be controlled by actuators 152. In addition, actuators 152 may be used to cause the chair to bump or vibrate.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game assembly 100 can also include an information reader 152, which can include a card reader, ticket reader, bar code scanner, RFID transceiver, or computer readable storage medium interface. In some embodiments, the information reader 152 can be used to award complimentary services, restore game assets, track player habits and preferences, etc.

Figure 2:
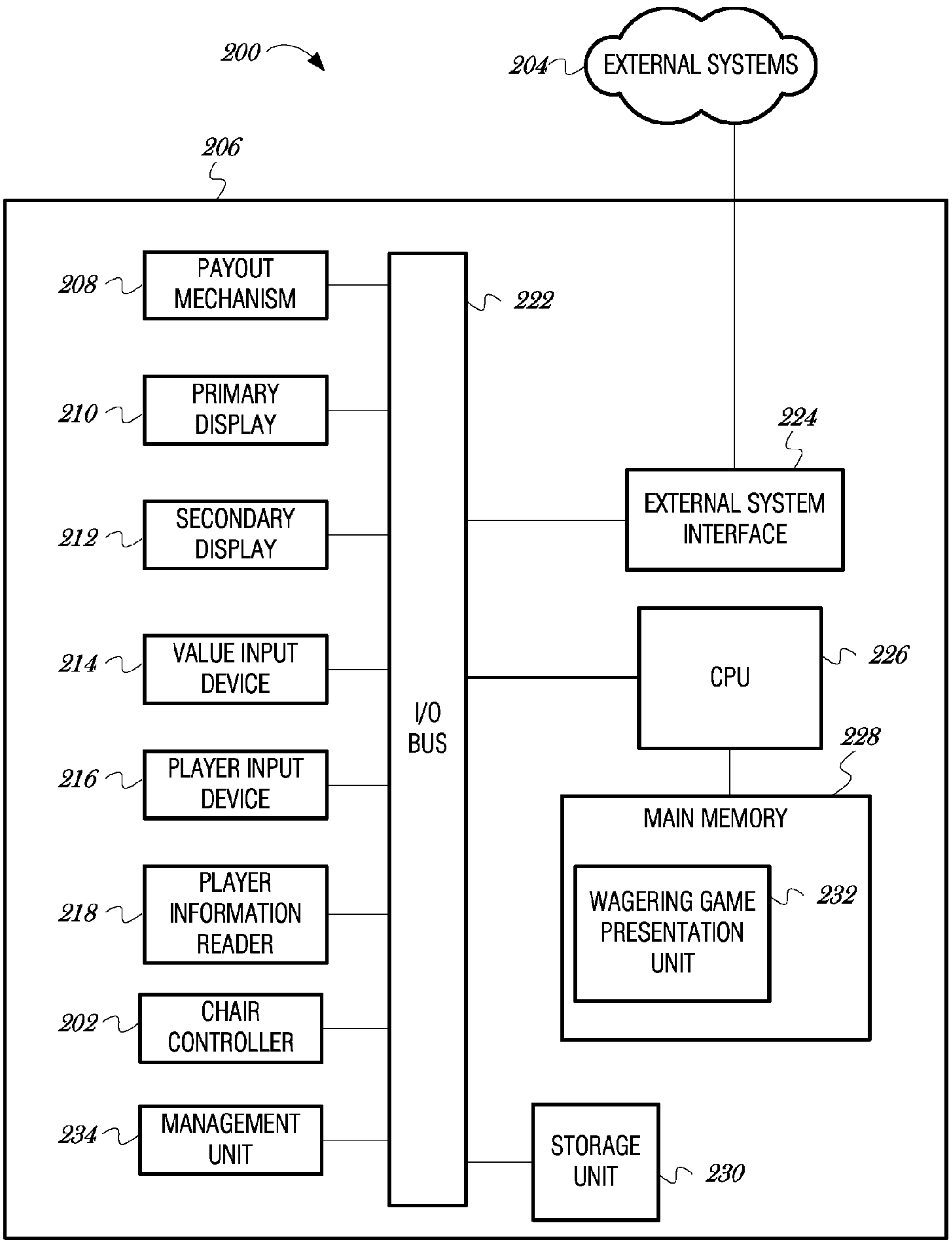
FIG. 2 schematically depicts a representation of one example of a wagering game assembly.

FIG. 2 is a block diagram representation of an architecture of an example wagering game machine 206, including a control system, according to example embodiments of the invention. As shown in FIG. 2, the example wagering game machine 206 includes a central processing unit (CPU) 226 connected to system main memory 228, and a wagering game presentation unit 232. Wagering game presentation unit 232 can present wagering games at least in part through display functionality associated with the system, such as, for example, the previously described roulette and "virtual" or video poker, blackjack, keno, etc. In this example configuration, the CPU 226 is also connected to an input/output (I/O) bus 222, which facilitates communication with and between the wagering game machine's additional components. It should be clearly understood that many wagering game machines will not include all of the described components; and that components need not be connected through a single bus, or through a bus at all. In this illustrative example, the I/O bus 222 is connected to a payout mechanism 208, primary display 210 (which may be either a touch screen display or a conventional display), secondary display 212, a value input device 214, a player input device 216, and a player information reader 218 and other output devices. The I/O bus 222 may also be connected to an external system interface 224, which is connected to external systems 204 (e.g., wagering game networks).

Chair controller 202 provides an interface between components of wagering game machine 206 and the motion capable chair 150 (FIG. 1). Chair controller 202 comprises hardware, firmware and software used to transfer commands and data between the motion capable chair 150 and components of wagering game machine 206 that may control the chair. For example, a wagering game executed on the wagering game machine by CPU 226 may include instructions indicating that the motion capable chair is to be moved or positioned in a desired manner. These instructions are translated to commands and data that may be sent to the motion capable chair through the chair controller 202. Chair controller 202 may be communicably coupled to the motion capable chair in any of a number of ways, including wired and wireless connections. Although shown in FIG. 2 as directly connected to I/O bus 222, chair controller 202 may be coupled to the bus through an intermediary mechanism such as a USB (Universal Serial Bus) connection.

When present, the value input device 214 can include, for example, a reader configured to receive credit from a stored-value card (e.g., casino card, smart card, debit card, credit card, etc.) inserted by a player. The value input device 214 can also comprise a sensor (e.g., an RF sensor) configured to sense a signal (e.g., an RF signal) output by a transmitter (e.g., an RF transmitter) carried by a player. The value input device 214 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 206. Still other value input devices 214 can make use of touch keys on the touch screen. Upon entry of player identification information and, preferably, secondary authorization information (e.g., a password, PIN number, stored value card number, predefined key sequences, etc.), the player can be permitted to access a player's account. As one potential optional security feature, the wagering game machine 206 can be configured to permit a player to only access an account the player has specifically set up for the wagering game machine 206. Other conventional security features can also be utilized to, for example, prevent unauthorized access to a player's account, to minimize an impact of any unauthorized access to a player's account, or to prevent unauthorized access to any personal information or funds temporarily stored on the wagering game machine 206.

The player input device 216 can include the value input device 214 to the extent the player input device 216 is used to place wagers. Where inputs and/or wagers are received through the touch screen, as described herein, in many example systems, there may be no need for a separate player input device. In some examples, the wagering game machine 206 will include a player information reader 218 that facilitates identification of a player by reading a card with information indicating the player's identity (e.g., reading a player's credit card, player ID card, smart card, etc.). Such player information reader 218 can alternatively, or also, include a bar code scanner, RFID transceiver or computer readable storage medium interface. In one embodiment, the player information reader 218 comprises a biometric sensing device. Another application of the player information reader 218 may include a reader, such as an RFID interrogator, to read an RFID.

Management unit 234 may be used to coordinate and synchronize activities among multiple wagering game machines. For example, management unit 234 may communicate with management units on one or more other wagering game machines to coordinate and synchronize movement of their respective motion capable chairs, lighting, audio and other aspects of the presentation of wagering games and bonus games on a group of machines. Management unit 234 can communicate with management units on other wagering game machines through external system interface 224, or it may communicate through a communication interface on management unit 234 that couples the management unit to the communication interfaces of other management units on other wagering game machines. In some embodiments, management unit 234 may be assigned an identifier that uniquely identifies the management unit, and that may be used to provide a location or order of the management unit within a bank of wagering game machines.

In one embodiment, the wagering game machine 206 can include additional peripheral devices and/or more than one of each component shown in FIG. 2. For example, in some cases, the wagering game machine 206 can include multiple external system interfaces 224 and multiple CPUs 226. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 can include hardware, firmware, and/or software for performing the operations described herein. Where functionality is preformed at least in part through execution of instructions retained in software and/or firmware, those instructions will be stored (in the machine or in another component) in one or more instances of machine-readable storage media. Machine-readable media includes any mechanism that provides (e.g., stores and/or transmits) information in a form readable by a machine (e.g., a wagering game machine, computer, etc.). Machine-readable media thus includes any media suitable for transmitting software over a network. The above-mentioned "machine readable storage media" is a subset of such machine-readable media, and includes any form of tangible storage media capable of storing data and/or instructions, including, for example, read only memory (ROM), random access memory (RAM), magnetic disk storage media, optical storage media, flash memory devices, etc.

Figure 3:
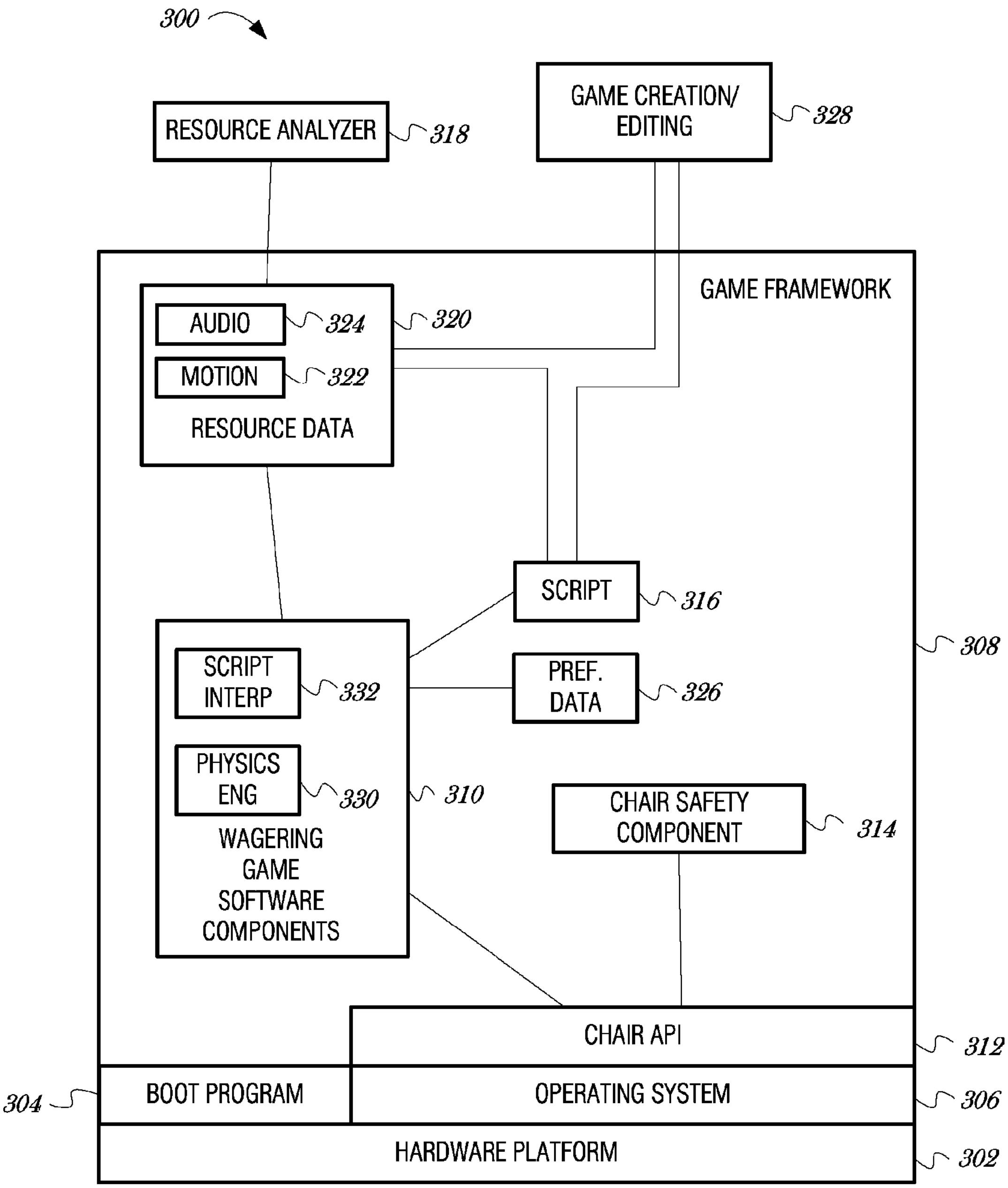
FIG. 3 depicts a block diagram of an example architecture for a wagering game assembly as described herein.

Referring now to FIG. 3, there is illustrated a block diagram of an architecture for a wagering game machine 300, according to example embodiments of the inventive subject matter. As shown in FIG. 3, the wagering game architecture includes a hardware platform 302, a boot program 304, an operating system 306, and a game framework 308 that includes one or more wagering game software components 310. In various embodiments, the hardware platform 302 may include a thin-client, thick-client, or some intermediate derivation. The hardware platform 302 may also be configured to provide a virtual client. The boot program 304 may include a basic input/output system (BIOS) or other initialization program that works in conjunction with the operation system 306 to provide a software interface to the hardware platform 302. The game framework 308 may include standardized game software components either independent or in combination with specialized or customized game software components that are designed for a particular wagering game. In one example embodiment, the wagering game software components 310 may include software operative in connection with the hardware platform 302 and operating system 306 to present wagering games, such as video poker, video black jack, video slots, video lottery, etc., in whole or part. According to another example embodiment, the wagering game software components 310 may include software operative to accept a wager from a player. According to another example embodiment, one or more of the wagering game software components 310 may be provided as part of the operating system 306 or other software used in the wagering game system 300 (e.g., libraries, daemons, common services, etc.).

Game creation and editing software 328 provides a user interface and other software for creating some or all of the portions of a wagering game. For example, game creation and editing software may provide the ability to specify one or more three-dimensional scenes of a base wagering game or bonus game, where the scenes have three-dimensional objects that move within the scene. The game creation and editing software may specify camera angles and positions for a virtual camera that defines a view within the three-dimensional virtual space defined for the scene, and may additionally specify a path and speed for moving the camera through the scene. The camera angles may specify a pitch, yaw and roll for the virtual camera. In some embodiments, game creation and editing software 328 produces one or more scripts 316 that contain commands and data that when interpreted, cause the one or more scenes to be presented by the wagering game.

Game creation and editing software 328 may be used to define or specify resource data 320 that are to be used during the presentation of a wagering game or bonus game. In some embodiments, motion resource data may be defined using a joystick or other input device to create motion data that corresponds with a scene created using the game creation and editing software 328.

Chair API (Application Programming Interface) 312 provides a software interface for use by various components such as wagering game software components 310 and chair safety component 314 such that the components can configure and control a motion capable chair of a wagering game assembly. Chair API 312 provides a set of function calls (also referred to as methods) and parameters that implement a protocol for communicating data to and from software, firmware and/or hardware that controls the motion capable chair.

A physics engine 330 may be included in wagering game software components 310. Physics engine 330 comprises software that receives definitions of graphical objects in a simulated three-dimensional space and applies rules of physical systems to the graphical objects in order to determine motion and interactions of the objects in the simulated three-dimensional space. Such rules may include gravity, friction, rigid body dynamics (including collision detection), soft body dynamics, and fluid dynamics. Output from the physics engine 330 may be used to determine motion of the motion capable chair.

In some embodiments, a script 316 may be used to define a sequence of actions that are part of the presentation of a wagering game. Script 316 may specify a sequence for a presentation of audio data and video data that are part of a wagering game presentation. Additionally, script 316 may specify positioning and movement for a motion capable chair. Further, script 316 may provide the conditions under which audio, video, or motion data are included as part of a presentation of a wagering game to a player. In some embodiments, the script 316 may include commands and data that are used to attenuate, amplify, filter, or turn the interface to the motion capable chair on or off. One or more of the wagering game software components 310 may read the script 316 or invoke a script interpreter 332 to read script 316 and perform operations defined within the script.

In some embodiments, the audio, video, and motion data that are used as part of the presentation of a wagering game may be included as resource data 320. Resource data 320 may be organized as a database or files in a file system. A script or wagering game component that desires to present a particular video, audio or motion sequence may refer to a label assigned to the resource in order to cause the resource to be invoked.

As an example of the above, a script may be used to define an audio, video, and motion presentation of a celebration sequence that is presented when a jackpot is won. The script may specify a video resource showing a fireworks display, an audio resource that provides the sounds of the exploding fireworks, and a motion resource that causes a motion capable chair to vibrate in coordination with the exploding fireworks display.

As a further example of the operation of the system, a bonus game may comprise a simulation of a plane flying through the sky that accumulates points or point multipliers by aiming for and flying through targets that appear in the sky. The physics engine may apply various rules regarding flight dynamics and gravity and generate data used to cause the chair to move in a manner that simulates the motion of the plane.

Preference data 326 comprises settings for various parameters that are associated with a player. In some embodiments, preference data 326 may include a preferred height for a chair. Further, the preference data may indicate a preferred start or end position of the motion capable chair. Additionally, preference data 326 may include scaling data that may be applied in some embodiments to chair motion data to scale the motion data or signals sent to a motion capable chair to either attenuate the motion or to enhance the motion of the motion capable chair.

In some embodiments, resource analyzer 318 is used to create motion resource data 322. Resource analyzer 318 reads audio data 324. Based on the various audio frequencies or combinations of frequencies in the audio data 324, resource analyzer 318 creates motion resource data 322. In some embodiments, resource analyzer 318 reads audio data and creates impulse data for the motion capable chair by replacing audio below 60 Hz in the audio data with a lower frequency range that is sent as impulse data or signals to the motion capable chair.

Chair safety component 314 comprises software, firmware, and/or hardware that is designed to ensure the safe operation of the motion capable chair. Chair safety component 314 monitors commands and data sent from wagering game software components to make sure that the commands and data cause the chair to operate within safety parameters. Upon detection that commands or data sent to the motion capable chair would cause unsafe operation, chair safety component 314 may modify the commands or data such that safe operation of the chair is possible. Alternatively, chair safety component 314 may override the commands and data, for example, by setting the chair to a predetermined neutral position. Further, the chair safety component 314 may cause brakes or other stopping mechanisms to cause the motion capable chair to stop moving.

Chair safety component 314 may monitor and use various sensors on the motion capable chair or within the wagering game assembly 100 in order to determine that the chair is being operated within safety parameters. For example, chair safety component 314 may utilize pressure sensors, weight sensors, temperature sensors, or cameras to determine if the chair is occupied. Further, such sensors may be used to determine if the occupant is fully reclined against the back of the chair or is leaning forward in the chair and adjust the operation of the chair accordingly.

In some embodiments, the chair safety component 314 runs in the foreground while motion related software runs in the background. Task priorities may be used to ensure that the chair safety component 314 takes precedence over other tasks, components, programs or thread running on the wagering game machine.

FIGS. 1-3 have provided details on various hardware and software architectures and features of a wagering game assembly having a motion capable chair. FIGS. 4-7 provide details on various operations performed within these architectures.

Figure 4:
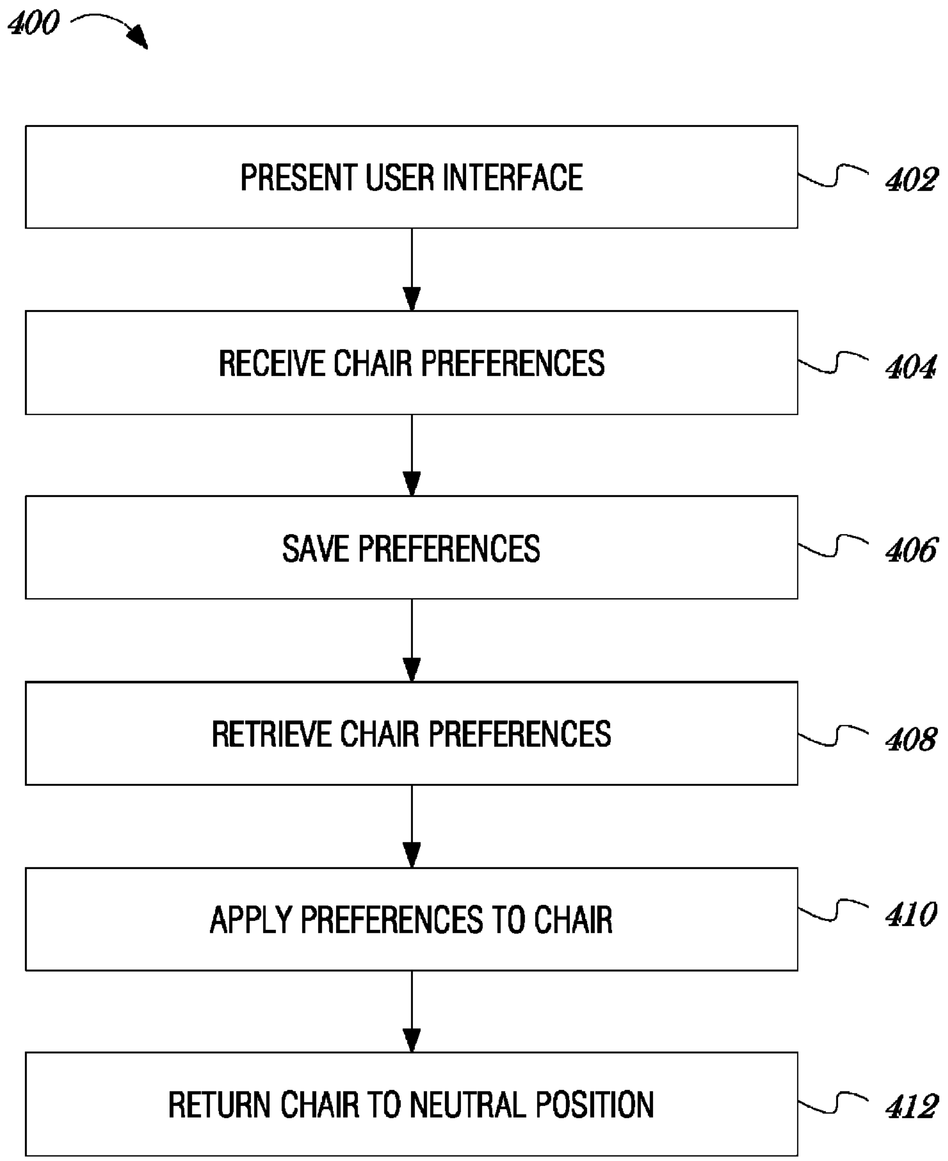
FIG. 4 depicts a flow chart of an example method for applying user preferences during operations of a wagering game assembly.

Example Wagering Game Machine Operations for Controlling a Motion Capable Chair FIG. 4 depicts a flowchart 400 of an example method using preference data to control the operation of a motion capable chair in a wagering game assembly. The method may be performed at various points in time following the initialization of a wagering game assembly. The method begins at block 402 by presenting a user interface having interface elements (menus, icons, sliders, buttons etc.) allowing a user to specify preference data regarding a motion capable chair.

At block 404, the system receives the chair preference data from the user interface. A player uses the user interface to set various preferences regarding the motion capable chair. Such preferences may include chair height preference for various phases of a wagering game, for example, an initial chair height, a game play chair height, and a game termination chair height. In addition, preference data may include separate or unified scaling factors to be applied to chair motion and to chair impulses (vibration). The scaling factors may be set to attenuate the perceived motion of the chair or to increase the perceived motion of the chair. A scaling factor of zero may be used if no chair motion (or no chair vibration) is desired. Chair preference settings may also include lumbar support position settings.

At block 406, the system saves the chair preference data. In some embodiments, the chair preference data may be saved on a wagering game server (e.g. server 806 of FIG. 8). Alternatively, the chair preference data may be saved locally on a wagering game machine. The chair preference data may be associated with the user in a number of ways. For example, a player tracking identifier may be used to associate the chair preference data with a particular user. Alternatively, a user identifier/password may be associated with the preference data. Still further, biometric data may be used to associate a particular player with their preference data.

It should be noted that saving the chair preference data is not required. For example, a user may set chair preference data that is used for a single game play session at a wagering game machine. Upon termination of the session, the chair preference data may be deleted or reset to default parameters.

Blocks 408-412 may be executed after chair preference data for a user has been saved, for example, when a user returns to a wagering game assembly with a motion capable chair. At block 408, the system retrieves the previously saved preference data. The chair preference data may be retrieved upon identifying the player using a player tracking system (e.g., upon entering a player tracking card into a card reader on the wagering game system). Alternatively, the chair preference data may be retrieved upon the user entering a valid user identifier/password combination. Still further, the player's chair preference data may be retrieved upon the system identifying the player using biometric data available to the system.

At block 410, the system applies the chair preference data. As indicated above, the chair preference data may be applied in a variety of ways. For example, if the player has specified an initial chair position (e.g., a chair height), the system may send commands or data to the motion capable chair indicating that the chair is to be moved to the player's preferred initial position. For example, a player may choose a position that is considered by the player to be easiest to enter the chair.

Preference data may be applied during wagering game play. For example, a player may have a preferred chair height during game play that is different from the initial preferred chair height.

Additionally, the player may have specified scaling data for scaling motion, vibration, or other aspect of chair movement. The scaling data may be applied to output of the physics engine that is used to control chair movement, it may be applied to data supplied to the chair API 312 (FIG. 3), or it may be applied by the chair API 312 to signals or data provided to the motion capable chair.

Further, preference data may be applied at the termination of a wagering game session. For example, when a player cashes out, the motion capable chair may be placed in a player's preferred position for exiting the chair.

At block 412, the motion capable chair is returned to a neutral or default position until a new gaming session is started.

The method of using preference data described above can be applied in different ways. For example, the preference data may be applied to all wagering game assemblies having a motion capable chair. Alternatively, a user may define multiple profiles of preference data, where each profile is used according to different conditions or scenarios. For example, one profile of preference data may apply to a first wagering game while a second profile may apply to a second wagering game. Further, profiles may differ based on general wagering game types. For example, one profile may apply to wagering games having a flight-based theme while another profile may apply to wagering games having a driving-based theme, while yet another profile may apply to a wagering game having a boating-based theme.

It should be noted that preference data may be saved automatically when a user changes a chair motion parameter from a default setting. For example, during a wagering game session a user may adjust the height or scaling factors. Such settings may be automatically saved. When the user returns to the wagering game, the user may then be prompted to confirm if they would like to use their most recent changes to the default settings in a new wagering game session.

Figure 5:
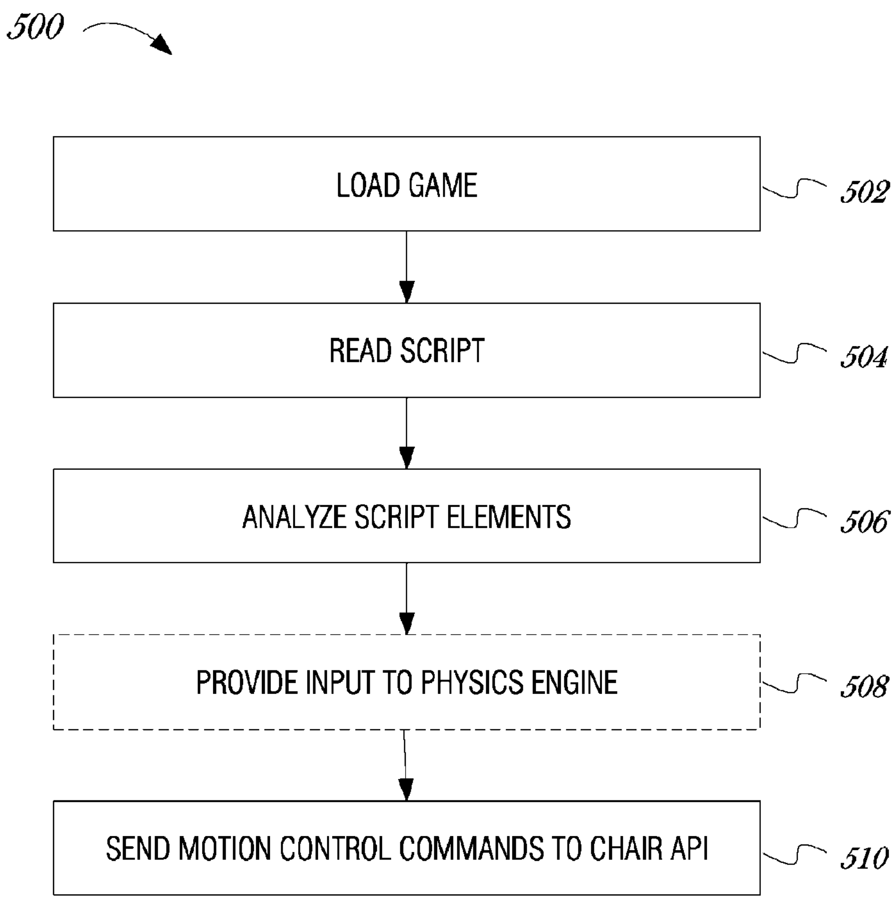
FIG. 5 depicts a flow chart of an example method for controlling a motion capable chair during operations of a wagering game assembly.

FIG. 5 is a flowchart illustrating a method for controlling a motion capable chair in a wagering game assembly. The method begins at block 502 by loading a wagering game to be executed on the wagering game assembly. The wagering game may be loaded from a memory local to the wagering game assembly (e.g., a hard drive, flash memory, ROM etc.) or it may be loaded from a server or other machine on a network.

At block 504, a script associated with the wagering game is read. As discussed above, the script may provide instructions and data that are used to present the wagering game to a user. In some embodiments, the script is read when the wagering game is loaded, for example, by an initialization routine executed by the wagering game.

At block 506, the elements in the script are analyzed to determine resources that may be required during script execution. Resource data 320, such as audio resource data and video resource data may be processed as part of this analysis. As an example, audio data 322 may be processed such that the audio data below 60 hz is replaced with lower frequency data. The replace frequency data may be then sent to the motion capable chair such that when the resource is invoked, the signals, commands or data cause impulse motion in the motion capable chair in accordance with the replaced data.

In some embodiments, at block 508 the script (or the wagering game) may provide inputs to a physics engine executing on the wagering game. For example, the script provide camera angles (pitch, yaw and roll) for the scene, it may define or invoke graphical objects that move through a scene, and may provide specify various physical rules (gravity, fluid motion, friction, etc.) that are to be applied to render the scene as part of the wagering game or bonus game.

At block 510, output of the physics engine defines kinematics for the motion capable chair. These kinematics may be used to determine the commands, data, or signals sent to the motion capable chair to drive the actuators in the chair such that the chair moves in response to the commands, data, or signals. The movement is thus coordinated with the scene being presented by the wagering game or bonus game. The kinematics data provides a mapping between the virtual world presented on the one or more screens of the wagering game to the physical domain represented by chair movement.

The signals or data sent to the motion capable chair may be filtered to remove such as high and/or low frequency movement data. Further, the data may be smoothed as desired.

In alternative embodiments, the script may cause the wagering game to send commands, data, or signals to the motion capable chair without the use of a physics engine. As noted above, player preference data may be used to scale the motion of the chair, either to attenuate or amplify the motion.

Figure 6:
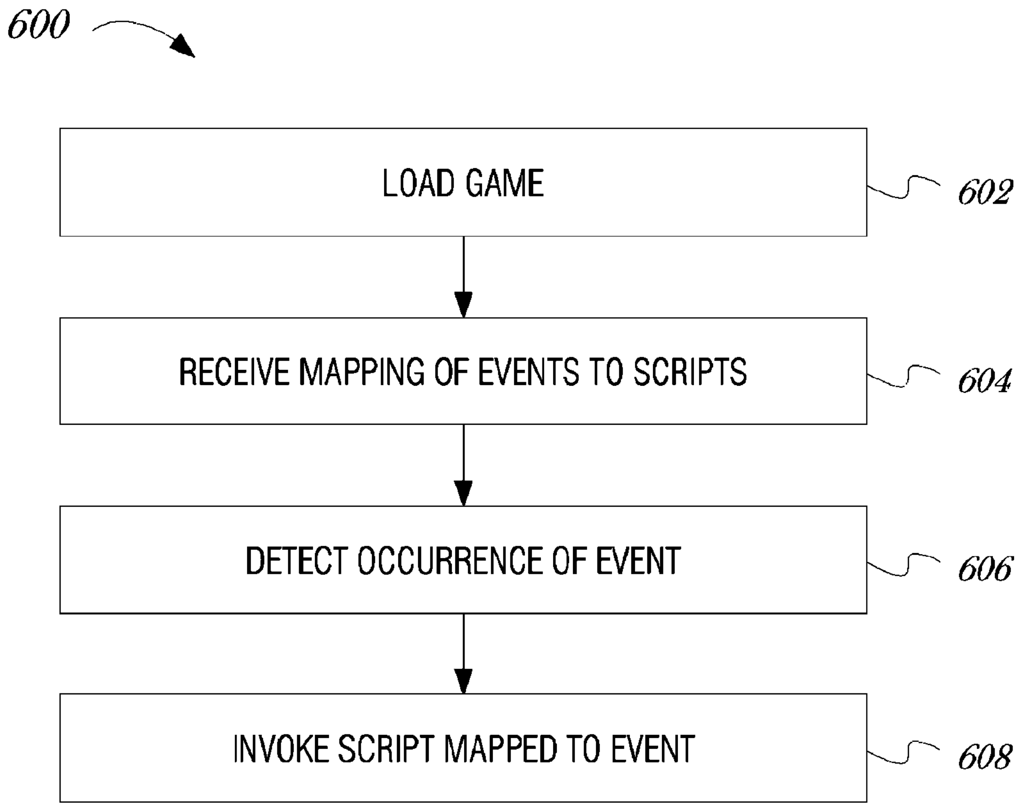
FIG. 6 depicts a flow chart of an example method for controlling a motion capable chair including mapping events during operations of a wagering game assembly.

FIG. 6 is a flowchart illustrating a method of operating a legacy wagering game and a motion capable chair. As used herein, a legacy wagering game is a wagering game which was not designed to use a motion capable chair, and does not include any code to interface with a motion capable chair. In some embodiments, the method begins at block 602 by loading the legacy mode wagering game. The legacy mode wagering game may be loaded when the wagering game machine is booted, or it may be loaded in response to a user selection from a menu of available games on the wagering game machine.

At block 604, the system executing the method receives a mapping of events associated with wagering games to scripts. Examples of events include celebration events (e.g., a jackpot win), cash-out events, etc. The mapping thus defines one or more scripts that are to be invoked when the event occurs. The mapping may be encoded in software associated with the wagering game, but not directly within the legacy wagering game. For example, the mapping may be part of an operating system component (driver, plug-in, dynamically loaded library, etc.) that is provided as part of the software environment in which the legacy wagering game executes. Alternatively, the mapping may be provided in a file or database that is read by such an operating system component.

At block 606, the system detects the occurrence of the event. Detection of an event may occur in various ways. For example, the event may be detected when the legacy wagering game calls a method or function associated with the event that is handled by a driver, plug-in, or dynamically loaded function.

Upon detecting an event, at block 608, the script or scripts mapped to the event are invoked. The script may include commands that cause the motion capable chair to move or vibrate For example, the chair may be made to move or vibrate as part of a celebration or cash-out event.

Figure 7:
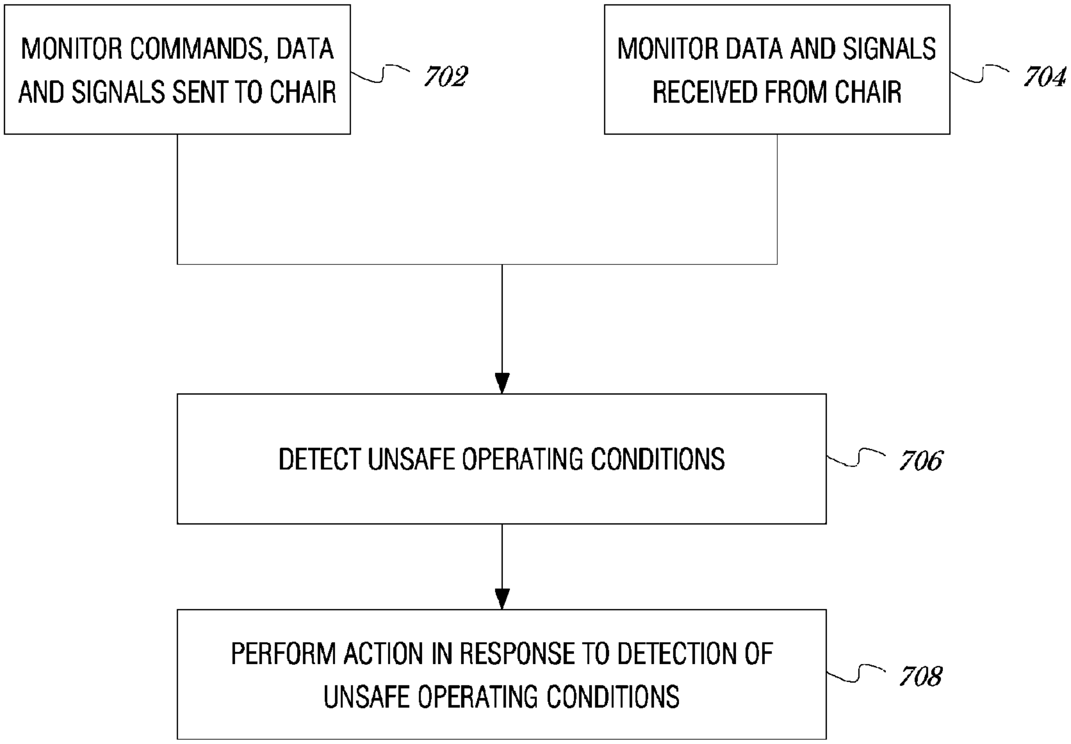
FIG. 7 depicts a flow chart of an example method for monitoring safety conditions during operations of a wagering game assembly.

FIG. 7 is a flowchart illustrating a method for monitoring the safe operation of a motion capable chair. The method begins at blocks 702 and 704. At block 702, a system executing the method monitors commands, data, and/or signals sent to a motion capable chair. At block 704, the system monitors data and signals received from a motion capable chair.

At block 706, the system detects unsafe operating conditions for the motion capable chair. The detection may be based on either or both of the commands, data, and/or signals sent to, or received from, the motion capable chair. Various conditions may be detected. For example, the system may detect that a person is attempting to get on or off the chair while the chair is in motion. Alternatively, the system may detect that a person is in the chair but is not fully reclined (e.g., is leaning forward in the chair). Further, the system may detect that the user desires to halt operation of the chair through the use of a stop button or other user interface element. Still further, the system may detect that there is an intermittent disconnect or other disruption in communications with the motion capable chair.

At block 708, the system performs actions in response to detecting unsafe operating conditions for the motion capable chair. Various actions may be performed, and the action or actions performed may depend on the condition that is detected. For example, in the case of a person attempting to get on or off of the chair while the chair is in motion, the system may cause the chair to immediately stop moving and stop execution of the wagering game or bonus game. In the case of detecting that a person is in the chair, but not fully reclined, the system may allow the chair to continue to move and the wagering game or bonus game to continue to execute, but may filter or limit the motion of the chair. In the case where there is an intermittent disconnect or other problem with communications with the chair, the system may allow the wagering game or bonus game to continue execution, but may stop movement of the chair and return the chair to a neutral or default position. In addition, a "call attendant" condition may be generated to alert the operator that there is a possible malfunction of the chair.

Example Wagering Game Network

Figure 8:
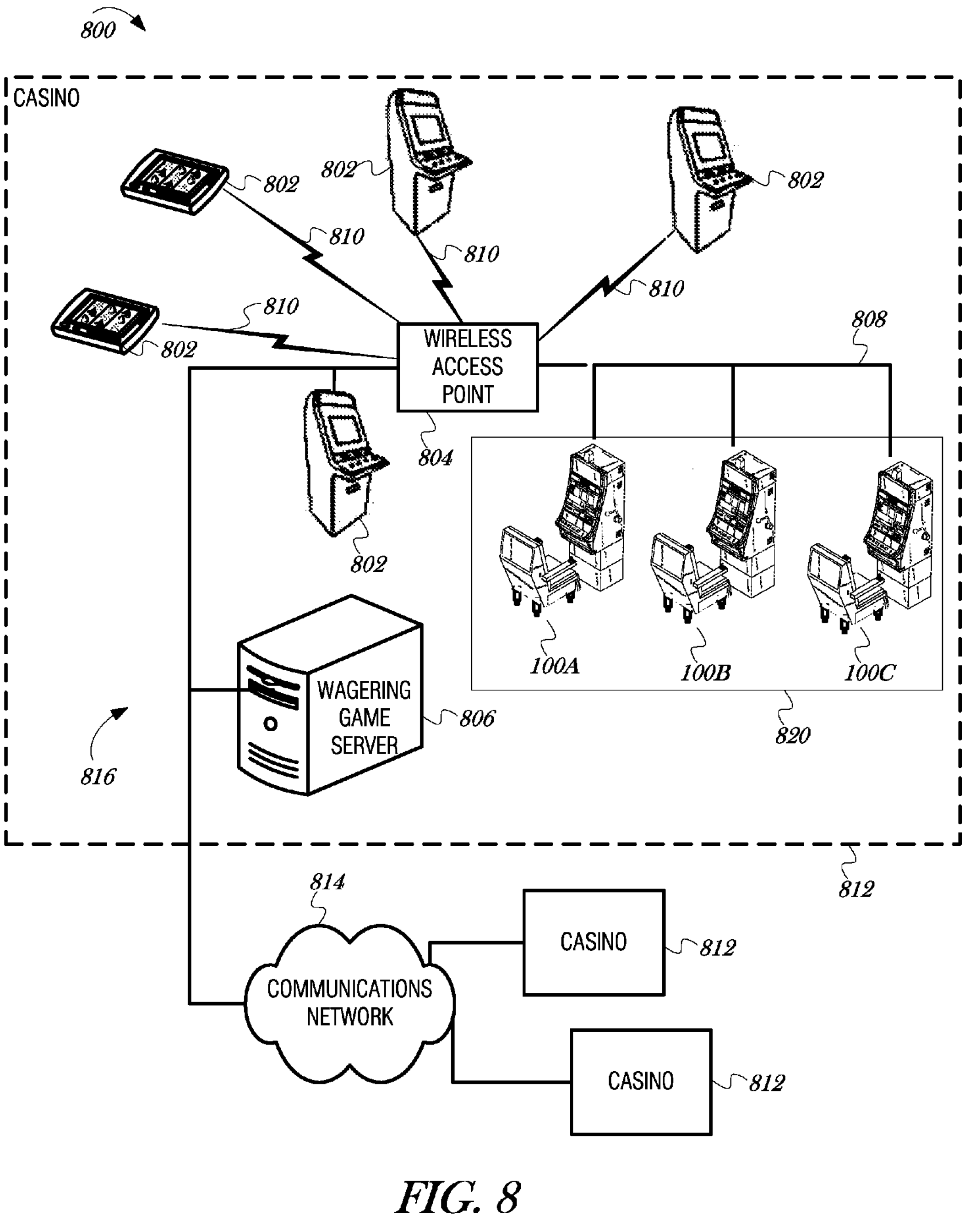
FIG. 8 depicts an example wagering game network, including a bank of wagering game assemblies having motion capable chairs.

While the previous discussion has illustrated operations with a perspective a single wagering game machine, FIG. 8 shows how a plurality of wagering game machines can be connected in a wagering game network 800, according to example embodiments of the invention. As shown in FIG. 8, the example wagering game network 800 includes not only a plurality of wagering game machines and banks of wagering games that may exist within a casino, but may also include multiple casinos 812 connected to a communications network 814.

Each of the plurality of casinos 812 includes a local area network 816, which may include a wireless access point 804, wagering game machines 802, and in some example, a wagering game server 806 that can serve wagering games over the local area network 816. As such, the local area network 816 includes wireless communication links 810 and wired communication links 808. The wired and wireless communication links can employ any suitable connection technology, such as serial communications lines, Bluetooth, 802.11, Ethernet, public switched telephone networks, SONET, etc.

Wagering game machines can be organized as a bank of machines 820, where the bank of machines may be linked through network 816, or through a network or other communications system that is local to the bank of machines 820. In some embodiments, bank of machines 820 may be comprised of wagering game machines that are the same type or have the same general theme. The bank of machines 820 may share an overhead sign or kiosk. In the example provided in FIG. 8, three wagering game machines 100A-C with motion capable chairs are shown. Those of skill in the art will appreciate that a bank may have two wagering game machines or more than three wagering game machines.

In some embodiments, movement of the motion capable chairs in a bank of machines 820 is coordinated. Thus an event at one machine in the bank may cause the motion capable chairs both on the machine generating the event and other machines in the bank to move. For example, a bank of wagering game machines may have a fishing theme. An event at one machine may cause the motion capable chair to simulate a wave hitting a virtual fishing boat represented in a scene in the wagering game. The system may cause motion capable chairs in other wagering game machines in the bank to move as the simulated wave hits their respective virtual fishing boats. Thus motion of the chairs in the bank of machines 820 is coordinated and synchronized such that it appears that a wave is passing by the simulated boats. As a further example, a bank of machines 820 of wagering game machines may present wagering games or bonus games that have a simulated battle. As one simulated ship in the bank is hit, the other ships may rock or move in response to the simulated explosion. The movement of the motion capable chairs on the bank of wagering game machines may be synchronized to simulate the rocking motion.

Synchronization and coordination of the movement of the motion capable chairs in a bank may be achieved in various ways in different embodiments. In some embodiments, a management unit 232 (FIG. 2) in control system 206 communicates with other management units in the control systems of other wagering game machines in the bank to synchronize and coordinate movement of their respective motion capable chairs. In some embodiments each machine in the bank is given an identifier. A timing signal may be propagated throughout the machines in bank of machines 820. Upon the occurrence of an event such as a wave event or other event intended to cause synchronized movement of the motion capable chairs in a bank of machines 820, the identifier of the wagering game machine initiating or generating the event is provided to the other wagering game machines in the bank. Each wagering game machine in the bank of machines 820 can compare its own identifier to the identifier of the machine generating the event and use the results of the comparison and the timing signal to determine when the motion should occur in the wagering game machine and a scaling factor to apply, if any, to the motion. For example, in the fishing boat example described above, the comparison of identifiers can be used to determine when the simulated wave arrives at the wagering game machine in the bank and a scaling factor for the wave. The scaling factor may be used to simulate the fact that the simulated wave would be smaller the further the wagering game machine is from the machine that generated the event.

In alternative embodiments, a wagering game machine, site controller, or server can coordinate and synchronize movement of motion capable chairs in the bank.

In one embodiment, the wagering game server 806 can serve wagering games and/or distribute content to devices located in other casinos 812 or at other locations on the communications network 814.

The wagering game machines 802 and wagering game server 806 can include hardware and machine-readable media including instructions for performing the operations described herein.

The wagering game machines 802 described herein can take any suitable form, such as floor standing models, hand-held mobile units, bartop models, workstation-type console models, etc. Further, the wagering game machines 802 can be primarily dedicated for use in conducting wagering games, or can include non-dedicated devices, such as mobile phones, personal digital assistants, personal computers, etc. In one embodiment, the wagering game network 800 can include other network devices, such as accounting servers, wide area progressive servers, player tracking servers, and/or other devices suitable for use in connection with embodiments of the invention.

In various embodiments, wagering game machines 802 and wagering game servers 806 work together such that a wagering game machine 802 may be operated as a thin, thick, or intermediate client. For example, one or more elements of game play may be controlled by the wagering game machine 802 (client) or the wagering game server 806 (server). Game play elements may include executable game code, lookup tables, configuration files, game outcome, audio or visual representations of the game, game assets, or the like. In a thin-client example, the wagering game server 806 may perform functions such as determining game outcome or managing assets, while the wagering game machine 802 may be used merely to present the graphical representation of such outcome or asset modification to the user (e.g., player). In a thick-client example, game outcome may be determined locally (e.g., at the wagering game machine 802) and then communicated to the wagering game server 806 for recording or managing a player's account.

Similarly, functionality not directly related to game play may be controlled by the wagering game machine 802 (client) or the wagering game server 806 (server) in embodiments. For example, power conservation controls that manage a display screen's light intensity may be managed centrally (e.g., by the wagering game server 806) or locally (e.g., by the wagering game machine 802). Other functionality not directly related to game play may include presentation of advertising, software or firmware updates, system quality, or security checks, etc.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A wagering game system comprising:

one or more processors;

a motion-capable chair coupled to a wagering game machine, wherein the motion-capable chair moves in response to commands received from the one or more processors; and one or more memory devices storing instructions including a scripting language interpreter, the instructions, when executed by at least one of the one or more processors, causing the wagering game machine to:

load, into at least one of the one or more memory devices, a wagering game application and at least one script associate with a wagering game presented by the wagering game application, the wagering game including at least one motion-related event;

read, via the scripting language interpreter, the at least one script and define chair motion commands corresponding to the at least one motion-related event in accordance with the at least one script;

in response to receiving, via at least one of one or more input devices, an input indicative of a wager that initiates the wagering game, present the wagering game on the wagering game machine; and in response to an occurrence of the motion-related event during the wagering game, send, via an interface between the wagering game machine and the motion-capable chair, the chair motion commands to the motion-capable chair to cause the motion-capable chair to move in response to the motion-related event.

2. The wagering game system of claim 1, wherein the chair motion commands include motion resource data identified by the at least one script.

3. The wagering game system of claim 1, further comprising a physics engine to determine motion and interaction of graphical objects presented by the wagering game, wherein output of the physics engine is used to cause the motion-capable chair to move in accordance with the output of the physics engine.

4. The wagering game system of claim 1, further comprising receiving, from at least one of an input device and one or more of the one or more memory devices, preference data for a player, the preference data modifying, at least in part, the chair motion commands associated with the motion-related event.

5. The wagering game system of claim 4, wherein the preference data includes one or more of a preferred initial position of the motion-capable chair and a scaling factor to be applied to the chair motion commands for the motion-capable chair.

6. The wagering game system of claim 1, further comprising an audio analyzer to receive audio data for a wagering game; analyze the audio data; and create chair motion commands in accordance with the audio data, the chair motion commands causing the motion-capable chair to move in response to a sound-related event.

7. The wagering game system of claim 1, further comprising a safety module to control the motion-capable chair upon determining that operation of the motion capable would violate one or more safety parameters.

8. A method comprising:

presenting, by at least one of one or more processors, a wagering game upon which monetary value may be wagered;

reading, via a scripting language interpreter executed by at least one of the one or more processors, at least one script associated with the wagering game, and defining, via at least one of the one or more processors, chair motion commands corresponding to at least one motion-related event in the wagering game, in accordance with the at least one script; and in response to an occurrence of the motion-related event during the wagering game, sending, by the one or more processors, the chair motion commands to a motion-capable chair, to cause the motion-capable chair to move in accordance with the chair motion commands.

9. The method of claim 8, wherein the chair motion commands include motion resource data identified by the at least one script.

10. The method of claim 8, wherein the chair motion commands include data defining a pitch, yaw, or roll for a scene of the wagering game.

11. The method of claim 8, further comprising:

receiving preference data for the user; and utilizing the preference data to modify the chair motion commands sent to the motion-capable chair.

12. The method of claim 11, further comprising:

setting a height of the motion-capable chair in accordance with the preference data.

13. The method of claim 11, further comprising scaling the chair motion commands sent to the motion-capable chair in accordance with the preference data.

14. The method of claim 8 further comprising:

upon determining an unsafe operating condition for the motion-capable chair, modifying the chair motion commands sent to the motion-capable chair.

15. The method of claim 14, wherein modifying chair motion commands sent to the motion-capable chair includes setting a position of the motion-capable chair to a neutral position.

16. The method of claim 14, wherein modifying the chair motion commands sent to the motion-capable chair includes scaling the chair motion commands.

17. The method of claim 8, further comprising coordinating movement of the motion-capable chair with movement of at least one other motion-capable chair in response to an event occurring during the presentation of the wagering game.

18. A machine-readable non-transitory medium having executable instructions stored thereon that, when executed, cause one or more processors to perform operations comprising:

loading, into at least one or more memory devices of a wagering game machine connected to a motion-capable chair, a wagering game application and at least one script associated with a wagering game presented by the wagering game application, the wagering game including at least one motion-related event;

reading, via a scripting language interpreter, the at least one script and defining chair motion commands corresponding to the at least one motion-related event in accordance with the at least one script;

in response to receiving, via at least one of one or more input devices, an input indicative of a wager that initiates the wagering game, presenting the wagering game on the wagering game machine; and in response to an occurrence of the motion-related event during the wagering game, sending, by at least one of the one or more processors, the chair motion commands to the motion-capable chair causing the motion-capable chair to move in accordance with the chair motion commands.

19. A wagering game system comprising:

one or more processors configured to present a wagering game upon which monetary value may be wagered;

a motion-capable chair coupled to the wagering game assembly, wherein the motion-capable chair moves in response to signals received from the one or more processors; and a scripting language interpreter configured to receive scripting language data including chair motion data;

a physics engine configured to determine motions and interaction of graphical objects presented by the wagering game; and wherein the one or more processors cause the motion-capable chair to move in accordance with chair motion data as well as an output of the physics engine.

20. A computer-implemented method comprising:

presenting, by at least one of one or more processors, a wagering game upon which monetary value may be wagered;

receiving scripting language data, the scripting language data including chair motion data;

determining, by a physics engine executed by at least one of the one or more processors, one or more motion parameters associated with one or more graphical objects in a scene of the wagering game;

determining, via at least one of the one or more processors, physics-related data to be sent to the motion-capable chair in accordance with the one or more motion parameters; and sending, via at least one of the one or more processors, chair motion data as well as the physics-related data to the motion-capable chair, and causing the motion-capable chair to move in accordance with the chair motion data and the physics-related data.

* * * * *